United States Patent [19]
Wetstone

[11] 3,856,257
[45] Dec. 24, 1974

[54] MOLDED PICTURE FRAME
[76] Inventor: Janet M. Wetstone, 1041 Crane Rd., N.E., Atlanta, Ga. 30324
[22] Filed: Aug. 6, 1973
[21] Appl. No.: 386,026

Related U.S. Application Data
[63] Continuation-in-part of Ser. No. 142,701, May 12, 1971, abandoned.

[52] U.S. Cl..................... 249/160, 40/152, 249/140
[51] Int. Cl............................................ B41b 11/54
[58] Field of Search ...... 40/152, 154; 249/160, 163, 249/165, 168, 140

[56] References Cited
UNITED STATES PATENTS
2,291,672  8/1942  Youngberg ..................... 249/168 X
3,336,689  8/1967  Miller ................................... 40/152

Primary Examiner—Roy Lake
Assistant Examiner—DeWalden W. Jones
Attorney, Agent, or Firm—Burton L. Lilling

[57] ABSTRACT

This invention provides a method for manufacturing a picture frame from molded segments, or strips, which can be connected by keying members placed in keyed concavities formed in the strip when it is molded. Preferably, the keying members are formed substantially simultaneously, by molding, when molding the strip.

This invention also provides a picture frame fabricated from such molded keyed strips, joined together.

This invention further provides a two-part mold which can be used for molding a strip with the keyed concavities while substantially simultaneously molding the keying members.

This invention also provides a method for forming a picture frame having an antique flaked paint appearance.

4 Claims, 7 Drawing Figures

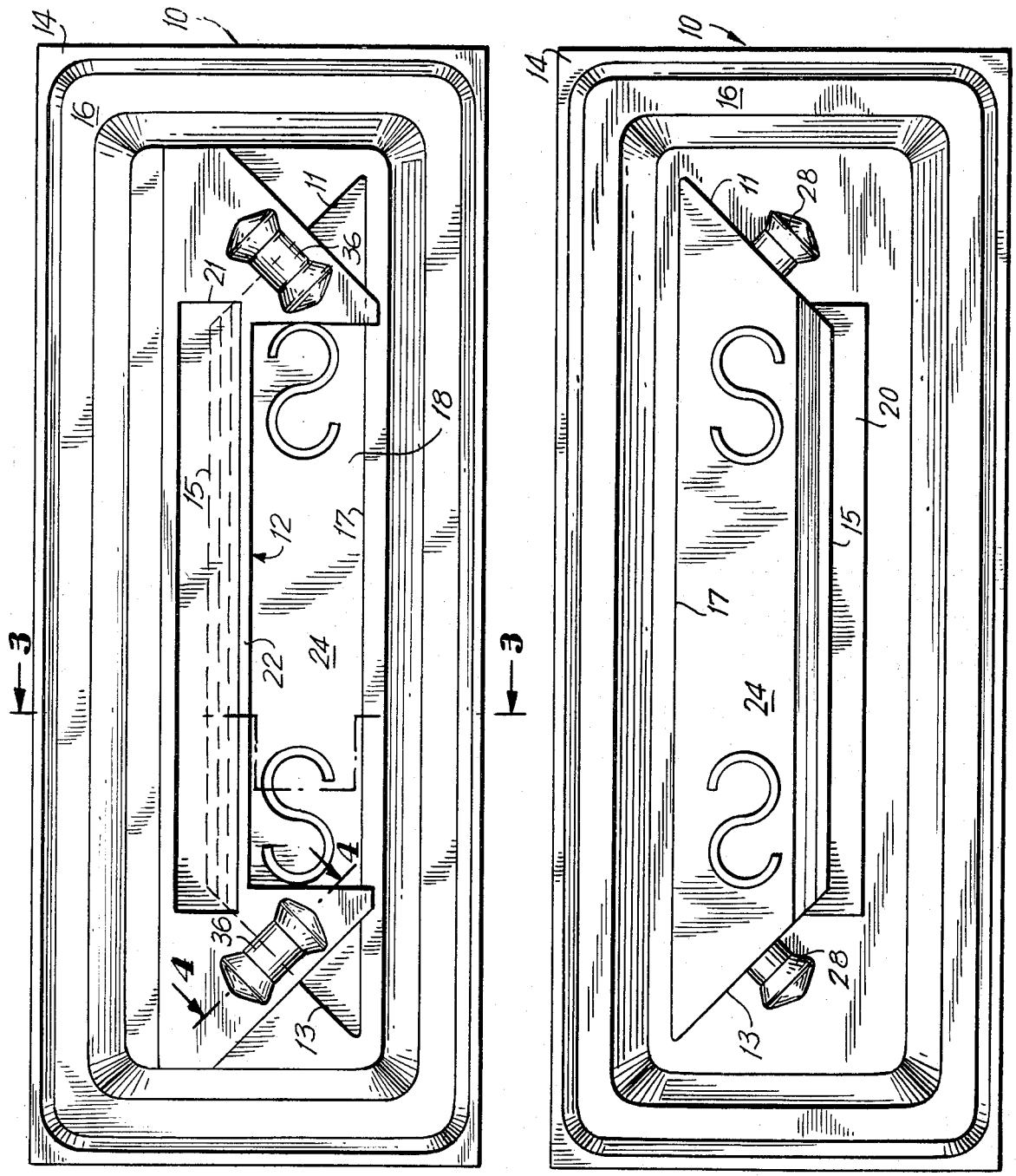

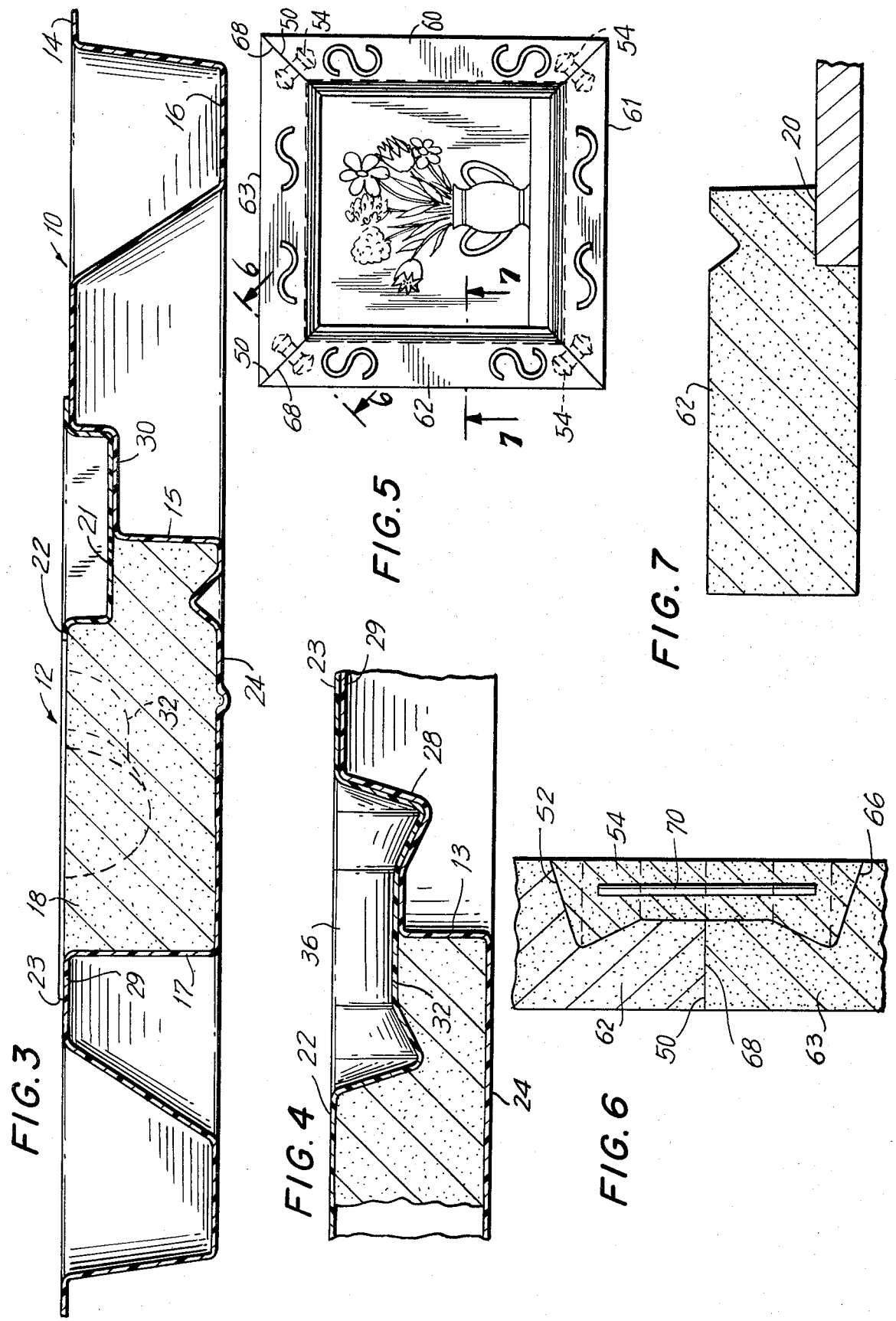

MOLDED PICTURE FRAME

This application is a continuation-in-part of serial No. 142,701, filed May 12, 1971, now abandoned.

As is well known to those versed in the art, conventional wooden picture frames involve substantial handwork, both in the manufacture, fabrication and assembling, as well as in the finishing of the front or exposed surfaces, necessarily resulting in relatively high cost, especially to artists or other persons of modest means who produce substantial numbers of pictures requiring framing.

Attempting to overcome these problems, workers have turned towards the use of moldable materials, forming frames from, for example, plaster, solid resin or expanded, or cellular, resin materials, by molding these products to the desired size, shape and surface appearance. See, for example, U.S. Pat. No. 3,186,118. Various other articles bearing complex surface carvings have also been prepared from moldable materials as a substitute for wood, using, for example, plaster. See, for example, U.S. Pat. No. 903,189. However, such molded frames were limited to being formed in the mold in certain specific sizes and any time a change in size became necessary, an entirely new mold must be prepared. Although the preparation of each item was made relatively inexpensive by the use of such molds, the preparation of each mold remained an expensive operation, much more expensive than preparing an individual frame.

Although various means had been suggested to incorporate or to apply pigments or paints, within or onto, the surface of such molded products (see, for example, U.S. Pat. Nos. 3,206,567 and 2,316,143), the highly desirable antique, flaked paint appearance, which enhances the appearance and value of certain heavy, deeply carved frames, could not be readily obtained without painstaking handwork.

In accordance with the present invention, there is provided a method for forming a picture frame by molding individual portions, or strips of desired length and shape, having the desirable surface appearance molded thereon, while simultaneously forming means for joining the strips to form a completed frame. The individual strips and joiners can then be connected to form picture frames of various sizes.

This invention further provides a picture frame formed of independently molded sections or strips, which are joined by independently molded keys, or grippers, to form a complete molded frame.

This invention provides still further a two-part mold combination, comprising a female mold and juxtaposed thereagainst a hermaphroditic mold, comprising both male and female molding portions.

There is further provided, in accordance with this invention, a method for providing a picture frame having a desirable antique flaked paint appearance.

The procedures and apparatus of this invention are exemplified by the following specific examples of preferred embodiments thereof. These embodiments merely reflect preferred species and are intended to exemplify the advantages and objects of the present invention. They are not intended to be exclusive of the full scope of this invention, which is defined by the claims appended below.

FIG. 1 is a top plan view showing the combined two-part mold, including the concave portion of the female mold and the outward facing portion of the hermaphroditic mold;

FIG. 2 is a bottom plan view of a mold for forming a strip and keying means, in accordance with the present invention;

FIG. 3 is a view in cross-section along lines 3—3 of FIG. 1, illustrating the combined mold in its operative condition;

FIG. 4 is a partial view in cross-section along lines 4—4 of FIG. 1, in operative condition;

FIG. 5 is a top view showing a frame formed from the strips formed in the mold shown above.

FIG. 6 is a partial view in cross-section along lines 6—6 in FIG. 5; and

FIG. 7 is a view in cross-section along lines 7—7 of FIG. 6.

Referring now to the drawings, there are provided a female mold, generally designated by the numeral 10, and a hermaphroditic mold, generally designated by the numeral 12.

The female mold 10 has a generally rectangular outline configuration and includes a marginal lip portion and immediately interior of the marginal lip portion 14 is an annular depression 16, serving to catch any molding material overflowing from the depressed, female mold portion 18. The female mold portion 18 is formed in the desired general outline configuration of the piece to be molded, in this case defined by inner side wall portion 15, outer side wall portion 17 and a front wall 24, extending between the inner and outer side walls 15 and 17. The surface of the molded product is further defined by the transverse end-walls 11 and 13, extending between the inner and outer side walls 15 and 17. The inside surface of the piece to be molded can be formed by merely smoothing the top surface of the molding material. However, in the preferred embodiment shown in the drawings, where a rabbeted edge 20 is formed along the inside edge of the strip, the inner side wall portion 15 is lower than the outer side wall portion 17 and a portion of a male, or convex portion 21, of the hermaphroditic mold 12 extends over the inner side wall 15 of the female mold so as to form the desired rabbet 20. The remainder of the convex portion 21 is seated against ledge surface 30 of the female mold. The hermaphroditic mold 12 preferably does not extend across the entire female mold portion 18, when it is desired, for example, to insert a hook into the fluent molding material prior to hardening.

As shown, the front wall 24 of the mold has formed therein complex surface contours which are imparted to the casting material introduced into the mold cavity 18 which thus can assume substantially any desired ornamental surface, consistent with retaining the ability to withdraw the completed cast form from the mold after hardening; thus, re-entrant angles should preferably be avoided. (See FIG. 5).

The hermaphroditic mold 12, shown in the drawings, comprises the male surface 21, forming the level of the rabbet 20 on the back of the frame, and the convex outer surface of the keying means 32, which, as shown in the drawings in the operative condition, extend into the female mold 18. As shown, the female mold 10 includes two key depressions 28, comprising one end portion and at least a portion of the central part of each of the grippers. One end of each of the male surfaces 32 of the keying means formed in the hermaphroditic mold 12 is complementary to, and fits within, the keying depressions 28 in the female mold, the remaining portions extending into the female mold depression 18. (See especially FIGS. 1 and 4).

As shown, the keying means comprises each a central, generally semi-cylindrical, portion, i.e., having a semi-circular cross-section, and an expanded portion at each end, having an enlarged or expanded diameter. One end of each keying surface 32 fits into the key depressions 28 in the female mold, preferably with such a close fit as to prevent the seepage of any casting material between the two surfaces, thus eliminating the need for removing excess, or flash, material. Similarly, the depth of the male portion 21, relative to the depth of the convex surface 32, is such as to provide for direct contact between the flat ledge surfaces 21 and 30, to prevent the formation of any excess, or flash, material on the final cast product, extending from the rabbeted edge. (See FIG. 3).

The female depressions 36, forming the keying means in the hermaphroditic mold 12, are defined by the interior surface of the convex keying surface 32.

In operation, the female mold 10 is supported, generally horizontally, with the female mold portion 18 opening upwardly. The hermaphroditic mold 12 is placed such that the convex male surfaces 32 fit within the key depressions 28 in the female mold 10, and the rabbet surface 21 of the hermaphroditic mold 12 is in contact with the ledge 30 of the female mold. One end of each of the convex key surfaces 32 extends across and into the female mold portion 18.

Preferably, the front, side and end walls, 15, 17, 24, 11 and 13, of female mold 18 are coated with a releasing agent, for example, a liquid silicone. The convex or male surfaces of the hermaphroditic mold 12, specifically the rabbet surface 21 and the keying surfaces 32, are coated with a jelly-like material, for example, petroleum jelly, which serves as a bonding agent between the hermaphroditic male mold surfaces and the abutting female mold surfaces to prevent seepage of the casting material between the two mold members, thus preventing the formation of any flash and eliminating a large part of the finishing work normally required. That is, the two molds are then placed firmly in contact, such that the male keying surfaces 32 are firmly seated within the female keying depressions 36 in the female mold 10 and the rabbet surface 21 is seated against the ledge surface 30 of the female mold.

The combined mold is then placed on a preferably level surface and the depression 18 in the female mold 10 and the female keying depressions 36 in the hermaphroditic mold 12 are then filled with a fluent, settable molding material. Care should be taken to ensure that the molding material flows to all parts of the female mold depression 18, including the portions underneath the rabbet surface 21 and under the convex keying surfaces 32.

The molding material can be formed of substantially any cementitious, preferably thermosetting, material, which is non-reactive with the mold material and which can harden, preferably at room temperature, and preferably cure, also preferably at room temperature, to form the desired rigid frame strip; preferably the molding material does not shrink or contract during the hardening and curing so that the cured final product matches the mold exactly. Useful cementitious materials include inorganic, mineral-based cements, such as the gypsum cements, e.g., plaster of paris, Keen's cement, Parian cement, Martin's cement and Mack's cement, and also Portland cement and Aluminous cement, among others. Resinous, preferably thermosetting, organic cements can also be utilized for forming the rigid, continuous mass of the composite product. The most commonly available organic cements include the epoxy cements.

An example of a gypsum cement plaster which has been successfully employed are the HYDROCAL materials by United States Gypsum Company, particularly grade B-11. When using materials such as gypsum cement, which upon hardening may form a somewhat brittle product, reinforcing materials can be utilized, such as wire, or bars or mesh, preferably formed of metal, embedded within the fluent molding material prior to hardening. The use of a longitudinal reinforcing member 70, such as a wire or rod, is especially helpful in the keying members, which are especially prone to stress, see FIG. 6. Other useful molding materials include clay and paper mache.

If desired, gypsum cement, for example, can be mixed with coloring material, such as water-color pigments or dyes, and stirred to uniformly distribute the coloring. This results in a pre-colored picture frame, when the fluent material sets. Similarly, a marbleized appearance for the finished picture frame can be obtained by adding, for example, water-color pigments, dyes, or other coloring agents, by folding in these agents into the fluent molding material; that is, suitable coloring material can be incorporated into the molding material by repeated overturnings of the molding material, without stirring or beating, which results, in the final product, in a variegated or veined appearance.

Further, a distressed surface representation can be produced having the appearance of simulated worm holes, or distressed furniture, by, for example, whipping the fluent molding material, just prior to pouring, so as to form a froth or foam which, upon setting, displays the desired wormy effect. A similar effect can be obtained by substituting a jelly material for the release agent and incorporating into this jelly material, for example, coffee grounds or other hard particulate organic material, preferably of a black color. Other materials which can be used include, for example, coarse carbon black particles, known as, for example, thermal black.

The incorporation of coloring into the molding material before pouring and setting, serves to considerably reduce the production time; the overall period for a hand-production of a frame requiring about an hour. In contrast, the subsequent application of a coating of paint or wood stain, or the application of an antique effect, would require first curing of the plaster for about 3 days before painting.

A simple additional mode of decorating, resulting in an antique finish, is to apply paint to the mold in streaks. The paint can be the same color as introduced into the mold material, as by being folded into the mold material. If the same paint is both folded into the molding material and applied to the mold in streaks, it will present a dual-tone treatment in the finished product, appearing lighter in color in the plaster and more vivid in color as a coating on the plaster. Here again, substantial savings in time are achieved over prior decorating procedures which would require two entirely different painting operations.

This antiquing aspect of the present invention is equally applicable to the formation of a picture frame by the forming of individual strips in accordance with this invention, as well as to the molding of an integral frame, in accordance with the disclosure in the parent application, Ser. No. 142,701, filed May 12, 1971.

Following the hardening of the poured fluent molding material, e.g., the gypsum cement, the upper, hermaphroditic mold 12 should be separated from the female mold. The female mold 10 can then be slightly flexed, to push out the molded product, frame strip, or merely inverted and pressure applied against one end of the reverse surface to push the finished frame strip out of the mold. The gripper, or keying, pieces can be removed from their mold in the hermaphroditic mold by the same procedure.

As drawn, the frame strips have substantially straight sides and mitered ends forming a 45° angle. Thus, four of the strips joined together form a square, or rectangular, frame, depending upon the relative sizes of the joined sides. In assembling the individual strips to form a complete frame, it is often necessary to smooth the ends and the surfaces of a key or joint by, for example, sand-papering, taking care however to avoid changing the angle of the mitered ends, or the curvature of the key pieces or depressions. The frame strips should be well cured prior to being joined.

In assembling these strips, the mitered ends 50, the keying sockets 52 and key members 54 should be coated with an adehesive suitable for the molded material. One end of each of two keys 54 are placed in the proper sockets 52 in the two ends of each frame strip. Referring to FIG. 5, two opposing strips 60 and 62, with the keys 54 in place, are placed flat on a horizontal surface, with the bottom, or rabbeted surface, facing upwardly. Adjacent opposing strips 61 and 63 are then positioned so as to place the second ends of each of the keys 54 into the proper sockets 66 in these strips and pressed into place. The mitered ends 50 and 68 are in contact and the key means 54 serve to position each of the strips so as to form a proper rectangular frame.

The keying or gripping members can be in any desired shape, their function is merely to locate, in the proper juxtaposition, the adjacent strip members forming the picture frame and, once located, to prevent the strip members from being pulled apart by tension within the plane of the frame. Thus, the "dog bone" shape of the keying member shown in the enclosed drawings can be replaced, for example, by a zig-zag shaped keying member. The sockets in the strips must, of course, be of a complementary shape, so as to maintain the strips in the proper juxtaposition.

The frame structure can be further re-inforced by inserting into the molding mixture, while still fluent, before hardening, U-shaped pieces of metal, for example, with the apex, or rounded, central portion protruding out of the mixture. Upon hardening, and joining of the individual strips to form the rectangular frame as explained above, the U-shaped members 70, which should be preferably positioned towards the central portion of each strip, can be wired together, thus further serving to prevent separation of the strips and reinforcing the adhesive material suggested for use above. The U-shaped hooks, one or more of them, can also be utilized to provide means for hanging the frame, after the picture has been placed therewithin.

As shown in the drawings, the present invention can be utilized for forming frames having a wide variety of surface ornamentation or, if desired, having a substantially smooth surface, the surface being either flat or curved, as desired. Any designs which can be formed in the mold surface can be accurately reproduced in the molding material; as stated above, however, care should be taken that no re-entrant angles or other difficultly removable forms are formed.

The female mold portion and the female, or concave, portions of the hermaphroditic mold, at least, are preferably formed of a thin, flexible material, such as a flexible plastic sheet. A preferred material to use is high-impact, polystyrene resin, but other, preferably thermoplastic materials, can be used, such as a polybutyrate resin and polyacetate resin. The mold members can be readily formed, for example, by vacuum forming techniques, well-known to the art.

It is especially desirable that the hermaphroditic mold member 12 be formed from a thin, flexible material, having a sheet thickness, for example, of from about 0.01 to about 0.05 inch, especially in the portion forming the convex keying surface 32 for defining the keying slot; the complementary key-forming depression 36 formed in the hermaphroditic mold 12 is thus only slightly smaller than the key slot formed by the convex surface 32. The maximum thickness, which is practicable when simultaneously forming the keying members and the keying sockets in the strip, depends upon the shape of the key gripping member. For example, the dog bone member shown in the drawing requires that the thickness of the material forming the mold at the convex surface be not greater than the difference in the diameters of the central portion and the end portions.

The individual strips need not have straight edges but, for example, can be formed having curvilinear edges to form, for example, a circular or elliptical frame. In such cases, further, the ends of the individual pieces are not mitered to a 45° angle. Further, if desired, rectangular frames need not be mitered and butt joints can be utilized with the keying members. However, the mitered corners are preferred.

From the foregoing, it is seen that the present invention provides means and a product for obtaining a frame for pictures in an extremely efficient and economical manner.

Although the present invention has been described in some detail by way of illustration and example for purposes of clarity and of understanding, it is understood that changes and modifications of the specific examples can be made within the spirit and the scope of the present invention.

I claim:

1. A combined two-part mold for forming a segment strip for a picture frame and providing for the simultaneous formation, by molding, of the strip and keying means for attaching a segment to an adjacent segment, the combined mold comprising (a) a female mold having a first depression comprising an article space-defining surface for defining a strip, key depressions extending outwardly from the space-defining depression but continuous therewith, and an annular perimetric edge portion surrounding the depressions; and (b) a hermaphroditic mold comprising an annular perimetric edge portion adapted to engage in abutting relationship with at least a portion of the annular perimetric edge portion of the female mold; a front convex surface extending outwardly from the perimetric annular edge portions and a rear surface having a second and a third depressions comprising article space-defining surfaces for defining two keying means, first portions of the front convex surface fitting within the key depressions in the female mold and second portions extending across and into the first depression in the female mold; the combined mold, thereby, simultaneously permitting, when the annular perimetric edge portions are in abutting relationship and the convex surfaces on the hermaphroditic mold are properly juxtaposed within the key depressions in the female mold, the simultaneous molding of the frame strip, with key depressions formed therewithin, and the keying means.

2. The combined two-part mold of claim 1, wherein the hermaphroditic mold comprises, in addition, a flat convex surface extending from the perimeter portions downwardly into the depression in the female mold, along one side thereof, so as to limit the depth of fluent molding material which can be placed therewithin and thus providing for the formation of a rabbeted inner edge on a molded strip formed therefrom.

3. The mold of claim 1 comprising, in addition, an annular depression, surrounding the annular perimetric flat edges, for catching any fluent material overflowing out of the depression in the female mold.

4. The two-part combination mold of claim 1 wherein the mold members are formed of thin, flexible material.

* * * * *